Oct. 22, 1929.   F. D. CHAPMAN   1,732,552
BLANCHER
Filed Oct. 25, 1926   2 Sheets-Sheet 1
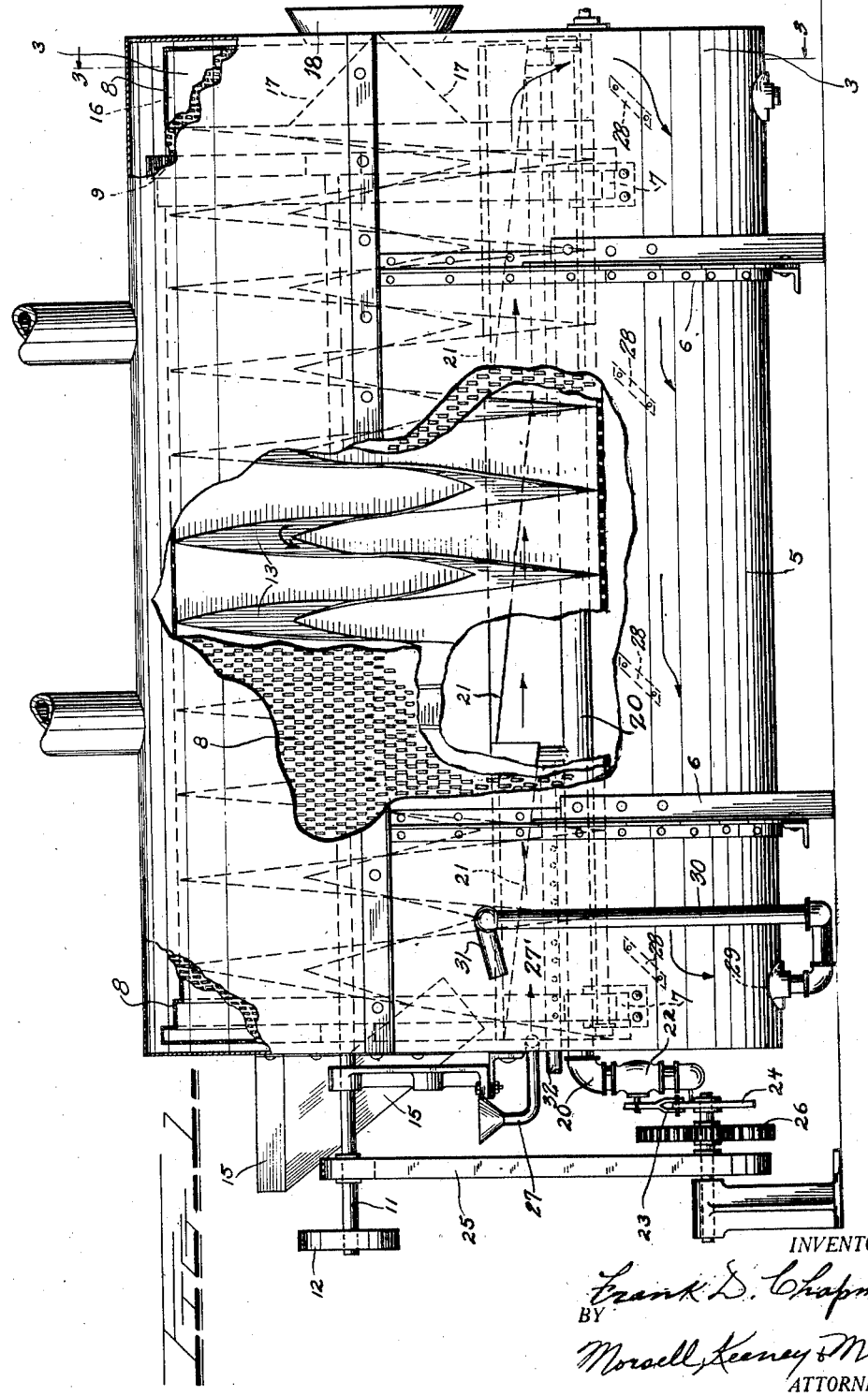
INVENTOR.
Frank D. Chapman.
BY
Morsell, Keeney & Morsell
ATTORNEYS.

Oct. 22, 1929.  F. D. CHAPMAN  1,732,552
BLANCHER
Filed Oct. 25, 1926   2 Sheets-Sheet 2
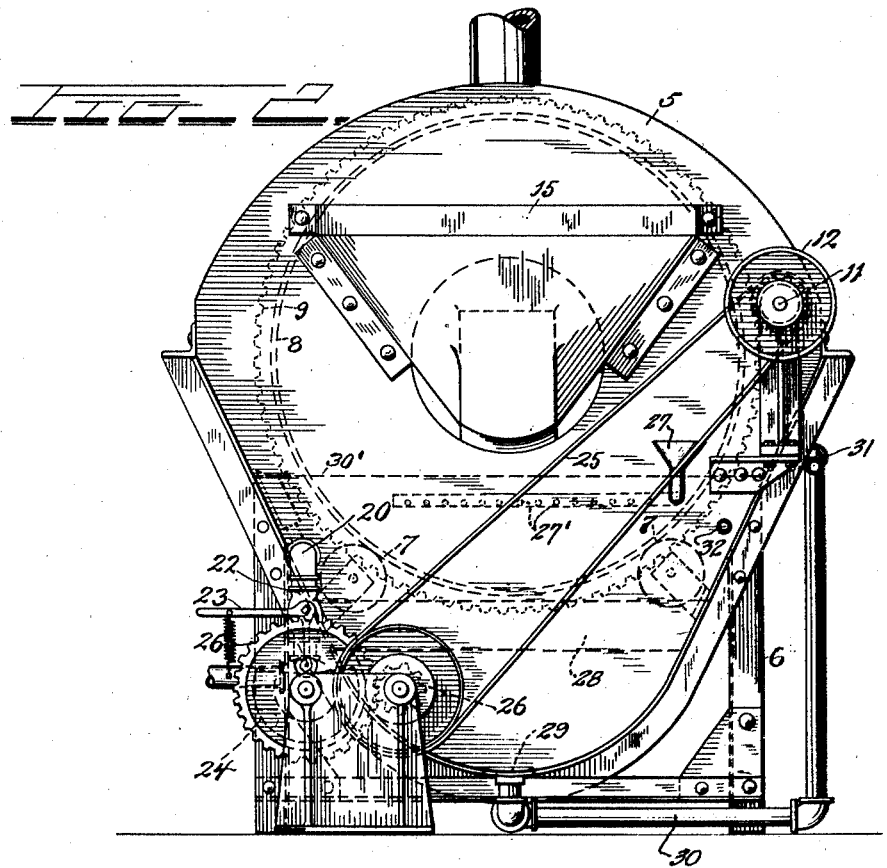
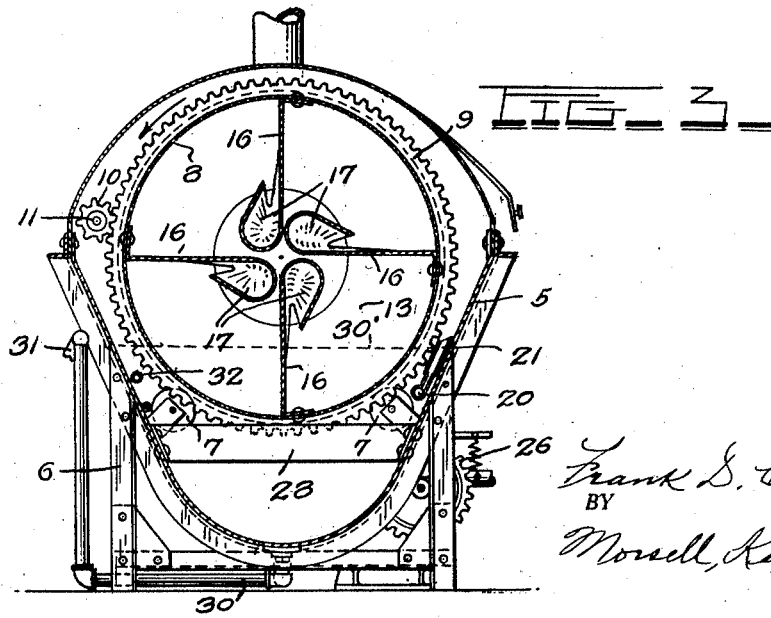
INVENTOR.
Frank D. Chapman
BY
Morsell, Keeney & Morsell
ATTORNEYS.

Patented Oct. 22, 1929

1,732,552

UNITED STATES PATENT OFFICE

FRANK D. CHAPMAN, OF BERLIN, WISCONSIN, ASSIGNOR TO BERLIN CHAPMAN COMPANY, OF BERLIN, WISCONSIN, A CORPORATION OF WISCONSIN

BLANCHER

Application filed October 25, 1926. Serial No. 144,150.

This invention relates to blanchers, and more especially to a machine of this character which is adapted for use in the canning art, and has for one of its objects to provide a blancher which will be simple in construction, comparatively inexpensive to manufacture and more efficient in use than those which have been heretofore proposed.

A further object of the invention is to provide a device of the class described which is adapted to skim the refuse from the surface of the water within the blanching drum, and at the same time remove the sludge or other foreign matter from the lower portion of the receptacle.

With the above and other objects in view which will appear as the description proceeds, the invention consists in the novel details of constructions and combinations and arrangements of parts more fully hereinafter disclosed and particularly pointed out in the appended claims.

Referring to the accompanying drawings in which like reference characters designate like parts in all of the views:

Figure 1 is a side elevational view of a blancher constructed in accordance with the present invention;

Fig. 2 is an end elevational view as seen from the left of Fig. 1; and

Fig. 3 is a transverse sectional view taken approximately on the plane indicated by the line 3—3 of Fig. 1, looking in the direction of the arrows.

Referring more particularly to the said drawings, the numeral 5 indicates a blancher drum or receptacle which is substantially egg shape in cross section, as will be clear from Figs. 2 and 3, and which is supported in any suitable manner as by the legs or supports 6. Rotatably mounted upon rollers 7 within the drum 5 is a foraminous inner drum or cylinder 8 also having end perforations and which is provided upon its exterior surface with an annular gear 9. Said gear 9 meshes with a pinion 10 which is carried by a longitudinal shaft 11 and said shaft projects through one end of the outer drum or container 5, and carries a pulley 12 by means of which it may be driven from any suitable source of power, not shown.

The said rotatable drum 8 is provided on its inner side with a spiral flange or flight 13 which is secured to the inner circumference of the drum 8 in any suitable manner and which serves to feed fruits, vegetables or other materials which are to be blanched and which are introduced into the interior of the said drum 8 through a feeding hopper 15, toward the opposite end of the said drum, as will be readily understood.

The drum 8 at its right hand end, as viewed in Fig. 1, is provided with a plurality of radially extending baffles or plates 16, the inner ends of which are preferably reversely curved, as indicated at 17, to receive and discharge from the drum fruit or vegetables that have been blanched. The said reversely bent portions 17 act as discharging buckets to collect the said blanched fruit and vegetables and discharge the same through an outlet opening 18 provided at the right hand end of the outer drum or container 5, as will be clear from Fig. 1.

A skimming pipe 20 extends longitudinally within the container 5 and outside of the drum 8 and is provided with a plurality of enlarged skimming hoppers 21 which extend above and drain into the pipe 20, as will be clear from Fig. 1, to receive the scum from the surface of the water. Said hoppers extend substantially the entire length of the drum and their upper open portions are approximately in alinement with the surface of water within the drum. The said pipe 20 is intermittently opened to receive the flow of scum and the opening is controlled by a valve 22 which may be automatically actuated through the spring retrieved valve lever 23 and a rotating cam 24 which cam is driven through the belt 25 and gears 26 from the shaft 11, as will be readily understood. By the provision of the intermittent flow, the scum will be more efficiently caused to flow into the openings of the hoppers 21 from all portions of the surface of the water, as the intermittent movement will continually change the direction of flow. Furthermore the direction of rotation of the drum will tend to move the scum towards the hoppers and, as shown in Fig. 3, the lower portion of each hopper inlet opening extends a slight distance below the surface line of the water within the tank to permit the free entrance of the scum.

Water is supplied to the drum through the pipe 27 which extends through the outer drum and along the end wall of the drum and is formed with openings 27' to direct the flow of water towards the opposite end of the drum, as indicated by the arrows in Fig. 1. As thus directed the flow of the upper portion of the water will be towards the opposite end of the drum while the flow of the lower portion of the water will be in the opposite direction, as indicated by the said arrows. In flowing in the opposite direction the water will be deflected downwardly by the angularly disposed transverse members 28 and move any sludge settling in the bottom portion of the tank towards the discharge opening 29 of the discharge pipe 30. Said pipe extends outwardly and upwardly to a point approximately on a level with the surface of the water within the drum and is formed with a hinged end part 31 to adjust the level of said surface. The water is heated by steam from a perforated pipe 32 which extends into the outer drum longitudinally of its length and below the level of the surface of the water.

In use, the fruit or vegetables or other produce which are to be blanched are introduced into the inclined feeding hopper 15 from which they are fed into the interior of the foraminous drum, as above described, the said drum being rotated through the shaft 11 and the gears 9 and 10, as above described. The food product will be fed longitudinally from the drum 8 through the threaded action of the spiral of the flange 13 and will be subjected to the blanching effect of the steam sprayed hot water which flows into the interior of the container 5 from the water pipe 27. As the food product approaches the right hand end of the apparatus, as viewed in Fig. 1, the particles of skin, dirt and other substances which have been separated from the rest of the fruit or vegetable during the blanching process will be worked out of the perforations of the inner drum by rotation of the drum and the flow of the water which fills the said container 5 up to substantially the level indicated by the dotted line 30 in Figs. 2 and 3 and will be discharged from the outer drum by means of the hopper members 21, and through the discharge pipe 30'. The fruit or vegetables themselves will be discharged from the end of the spiral flight by means of the bucket members 17. During the operation, the automatic valve 22 will be automatically turned on and off to intermittently discharge the scum from the surface of the water by means of the cam and spring retrived levers 24 and 23, as will be readily understood.

While one form of the invention has been illustrated and described, it is obvious that those skilled in the art may vary the details of construction as well as the precise arrangements of parts without departing from the spirit of the invention, and therefore, it is not wished to be limited to the above disclosure except as may be required by the claims.

What is claimed is:

1. In an apparatus of the class described, an outer receptacle; a foraminous drum rotatably mounted in said receptacle and having end inlet and outlet openings; means for feeding food material to said drum; means for moving said material through said drum; means for heating the contents of said drum and means including a hopper and its outlet opening for skimming the refuse from the water in said receptacle by intermittently opening and closing the hopper outlet, said hopper extending alongside of said drum.

2. In an apparatus of the class described, an outer water holding receptacle; a foraminous drum rotatably mounted in said receptacle and having end inlet and outlet openings; means for feeding food material to said drum; spiral means for moving said material through said drum; means for heating the contents of said drum; means including a hopper and its outlet for intermittently skimming the refuse from the water in said receptacle by opening and closing said hopper outlet, said hopper extending alongside of said drum and below the plane of the outlet opening of the drum; and means carried by said drum adjacent its discharge end for removing the blanched food material from the water in said drum.

3. In an apparatus of the class described, an outer water holding receptacle; a foraminous drum rotatably mounted in said receptacle and having end inlet and outlet openings; means for feeding food material to said drum; spiral means for moving said material through said drum; means for heating the contents of said drum; means including a hopper and its outlet opening for skimming the scum from the water in said receptacle, said hopper extending alongside of said drum and below the plane of the outlet opening of the drum, means for removing the sludge in the bottom portion of the receptacle; and means comprising a plurality of curved members carried by said drum adjacent its discharge end for removing the food material from the water in said drum.

4. In an apparatus of the class described, an outer water holding receptacle; a foraminous drum rotatably mounted in said receptacle and having end inlet and outlet openings; means for feeding food material to said drum; spiral means for moving said material through said drum; means for heating the contents of said drum; means including a hopper and its outlet opening for skimming the scum from the water in said receptacle, said hopper extending alongside of the drum and below the plane of the outlet opening of the drum; means for removing the sludge in the bottom portion of the receptacle; and means comprising a plurality of radial plates having curved portions carried by said drum adjacent its discharge end for removing the food material from the water in said drum.

5. In an apparatus of the class described, an outer water holding receptacle; a foraminous drum rotatably mounted in said receptacle and having end inlet and outlet openings; means for feeding food material to said drum; spiral means for moving said material through said drum; means for heating the contents of said drum; means including a hopper and its outlet opening for intermittently skimming the scum from the water in said receptacle, said hopper extending alongside of the drum and below the plane of the outlet opening of the drum, means for removing the sludge from the bottom portion of the receptacle; and means comprising a plurality of radial plates, the inner ends of which are curved, carried by said drum adjacent its discharge end for removing the food material from the water in said drum.

6. A blancher, comprising an outer water holding receptacle; a foraminous drum rotatably mounted in said receptacle and having end inlet and outlet openings and spiral means for moving food material through said drum; means for feeding food material to said drum; means for supplying water to said drum; means for heating the water within the receptacle; an overflow pipe controlling the level of the surface of the water within the receptacle and for discharging the sludge from the bottom portion of the receptacle; means extending alongside of the drum and below the plane of the outlet opening of the drum for intermittently discharging the scum from the surface of the water in the receptacle; and means for removing the blanched food material from the water in the drum and discharging it from the receptacle.

7. A blancher, comprising an outer water holding receptacle; a foraminous drum rotatably mounted in said receptacle and having spiral means for moving food material through said drum; means for feeding food material to said drum; means for supplying water to said drum; means for heating the water within the receptacle; an overflow pipe controlling the level of the surface of the water within the receptacle and for discharging the sludge from the bottom portion of the receptacle; a discharge means having an elongated opening extending alongside of the drum and below the plane of the outlet opening of the drum for discharging the scum from the surface of the water in the receptacle; means for intermittently controlling the flow through the discharge means; and means for removing the blanched food material from the water in the drum and discharging it from the receptacle.

8. A blancher, comprising an outer water holding receptacle; a foraminous drum rotatably mounted in said receptacle and having spiral means for moving food material through said drum; means for feeding food material to said drum; means for supplying water to said drum; means for heating the water within the receptacle; an overflow pipe controlling the level of the surface of the water within the receptacle and for discharging the sludge from the bottom portion of the receptacle; means for deflecting the flow of water in the receptacle downwardly; means for intermittently discharging the scum from the surface of the water in the receptacle; and means for removing the blanched food material from the water in the drum and discharging it from the receptacle.

9. A blancher, comprising an outer water holding receptacle; a foraminous drum rotatably mounted in said receptacle and having spiral means for moving food material through said drum; means for feeding food material to said drum; means for supplying water to said drum; means for heating the water within the receptacle; an overflow pipe controlling the level of the surface of the water within the receptacle and for discharging the sludge from the bottom portion of the receptacle; elongated hoppers within the receptacle and adjacent the surface of the water for receiving the scum from the surface of the water; cam means for intermittently controlling the flow of water and scum through the elongated hoppers; and means carried with the drum for removing the blanched food material from the water in the drum and discharging it from the receptacle.

10. A blancher, comprising an outer water holding receptacle; a foraminous drum rotatably mounted in said receptacle and having spiral means for moving food material through said drum; means for feeding food material to said drum; means for supplying water to said drum; means for heating the water within the receptacle; an overflow pipe having an adjustable outer end portion for controlling the level of the surface of the water within the receptacle and for discharging the sludge from the bottom portion of the receptacle; elongated hoppers within the receptacle and adjacent the surface of the water for receiving the scum from the surface of the water, cam means for intermittently controlling the flow of water and scum through the elongated hoppers, and means carried with the drum for removing the blanched food material from the water in the drum and discharging it from the receptacle.

11. In an apparatus of the class described, an outer receptacle; a foraminous drum rotatably mounted in said receptacle; means for feeding food material to said drum; means for moving said material through said drum; means for heating the contents of said drum; means for supplying water to the receptacle, deflector plates for directing the flow of water in the receptacle, and an overflow discharge means connected to the lower portion of the receptacle.

12. In an apparatus of the class described, an outer receptacle; a foraminous drum rotatably mounted in said receptacle; means for feeding food material to said drum; means for moving said material through said drum; means for heating the contents of said drum; means for supplying water to the receptacle, deflector plates for directing the flow of water downwardly in said receptacle, and an overflow discharge pipe connected to the lower portion of the receptacle for maintaining a predetermined level of water in the receptacle and for discharging the sludge from the bottom portion of the receptacle.

In testimony whereof, I affix my signature.

FRANK D. CHAPMAN.